_United States Patent Office_

3,746,757
Patented July 17, 1973

3,746,757
PROCESS FOR MANUFACTURING 6-NITRO-2-OXIMINOHEXANOIC ACID DERIVATIVES
Ryoji Kikumoto, Kanagawa-ken, Japan, assignor to Mitsubishi Chemical Industries, Limited, Tokyo, Japan
Filed May 26, 1969, Ser. No. 827,550
Claims priority, application Japan, May 30, 1968, 43/36,934
Int. Cl. C07c 101/10
U.S. Cl. 260—534 R    5 Claims

ABSTRACT OF THE DISCLOSURE

Novel compounds of 6-nitro-2-oximino-hexanoic acid and a salt, an ester and an amide thereof useful for intermediate in the lysine synthesis; and a process for manufacturing such compounds which comprises reacting 6-nitro-2-oximino-1-cyclohexene-1-ol with water together with a base selected from the group consisting of alkali and alkaline earth metal hydroxides, a salt of inorganic and organic acid having a dissociation constant less than $1.3 \times 10^{-3}$ and alkali and alkaline earth metal, ammonia and primary, secondary and tertiary amines.

---

Figure 1:
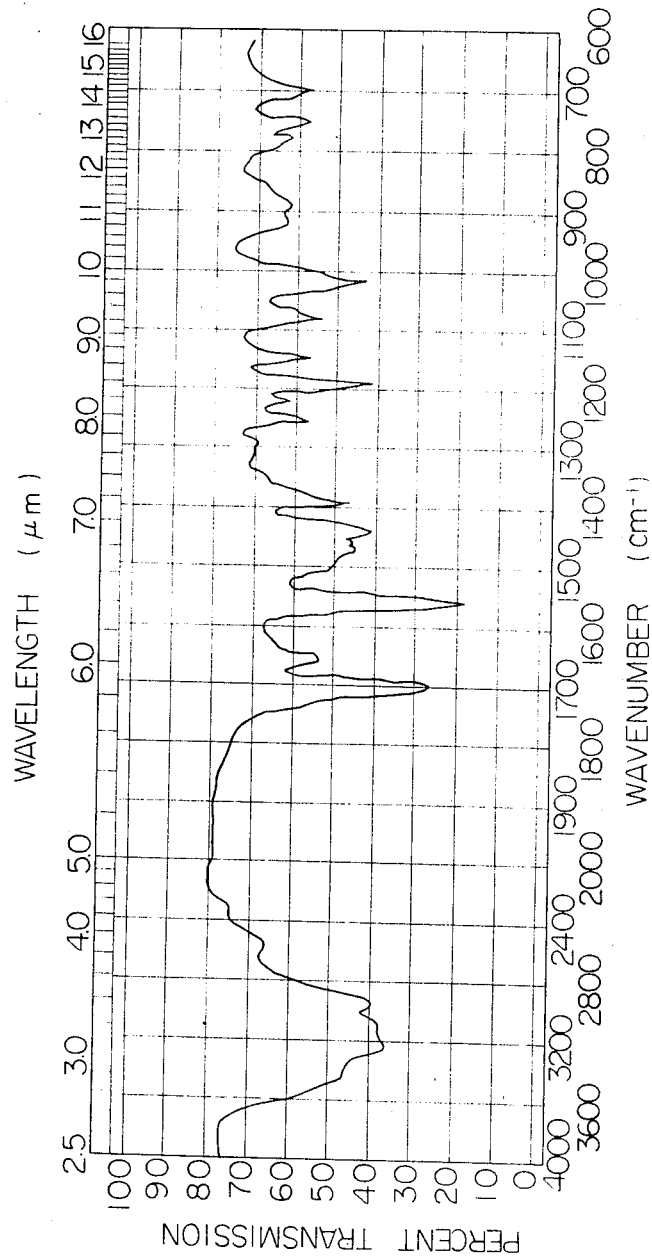

The present invention relates to a process for producing 6-nitro-2-oximino-hexanoic acid and derivatives thereof.

The compounds, 6-nitro-2-oximino-hexanoic acid and derivatives thereof are used as an intermediate in the synthesis of lysin.

Accordingly, one object of this invention is to provide a novel compound of 6-nitro-2-oximino-hexanoic acid and a process therefor.

Another object of this invention is to provide a novel compound, a salt of 6-nitro-2-oximino-hexanoic acid, more particularly alkali and alkaline earth metal salt, and an amide thereof, and to provide a process therefor.

These objects are readily accomplished according to this invention which comprises treating 2-nitro-6-oximino-1-cyclohexene-1-ol with water in the presence of a suitable base compound to form a salt or amide of 6-nitro-2-oximino-hexanoic acid, and, if necessary, converting the product into free acid form by a conventional way.

According to this invention both the raw material and the product are, to the best of the inventor's knowledge, novel compounds, and, therefore, the reaction system is also novel.

The reaction formulas are as follows, where the base compound is an alkali metal hydroxide or ammonium hydroxide:

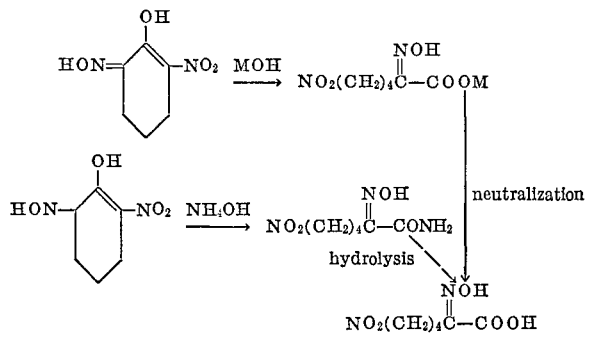

The 2-nitro-6-oximino-1-cyclohexene-1-ol used as raw material is a novel compound which is produced by reacting 2-nitro-cyclohexanone with an alcoholate or sodium amide in the absence of water to form 2-nitro-cyclohexanone alkali metal salt and reacting said salt with an alkyl nitrite in the presence of an alcoholate but in the absence of water and acidifying the product so obtained, or otherwise by reacting 2-oximino-cyclohexanone with an alkyl nitrite in the presence of an alcoholate but in the absence of water and acidifying the product so obtained.

The base compounds with which 2-nitro-6-oximino-1-cyclohexene-1-ol is charged in the reaction system according to this invention include alkali and alkaline earth metal hydroxides, such as sodium hydroxide, potassium hydroxide and barium hydroxide; a salt derived from an inorganic or an organic acid having a disssociation constant less than $1.3 \times 10^{-3}$ and alkali and alkaline metal compounds, such as sodium bicarbonate, sodium carbonate, potassium acetate, sodium acetate, sodium propionate, potassium propionate, sodium butyrate and sodium caproate; ammonium hydroxide; an organic amine, for example a primary, secondary and tertiary aliphatic amine, an aromatic amine, an alicyclic amine and a cyclic amine, such as trimethyl amine, triethyl amine, tributyl amine, n-butyl amine, di-n-amyl amine, aniline, cyclohexyl amine and pyridine. It was found that, of the base compounds, an alkali metal hydroxide, ammonium hydroxide and an alkali metal acetate are most effective. In some cases, a basic ion exchange resin can be employed as the base compound. The 2-nitro-6-oximino-1-cyclohexene-1-ol is added to water together with the base compound in an amount of a molar equivalent or more and they are reacted under agitation. If heat is used to accelerate the reaction, a temperature range of from 30° to 120° C., preferably 40° to 100° C., is recommended. At a temperature above 120° C., the reactants tend to decompose and the product to become discolored; on the other hand, at a temperature below 30° C. the reaction time is so long as to be uneconomical.

The reaction time varies widely depending upon the kind of base compound and the reaction temperature employed; it is generally from several tens minutes to several hours.

To check the degree to which the reaction has proceeded, after the 2-nitro-6-oximino-1-cyclohexene-1-ol has completely dissolved in the reaction system, the solution is occasionally sampled and the sample neutralized with an acid. If a precipitate is observed, it indicates that unreacted raw material remains. Therefore, it is easy to confirm when the reaction is terminated by the fact that, upon addition of the acid no precipitate is observed.

Upon completion of the reaction, to obtain 6-nitro-2-oximino-hexanoic acid, the reaction system is neutralized with an acid and then the system is extracted with a suitable organic solvent. The preferred solvent is ethyl ether, but benzene and toluene can also be used.

In case ammonium hydroxide is employed as the base compound, 6-nitro-2-oximino-hexanoic acid amide is formed, and the crude amide is recovered in crystal form from the reaction system by stripping off the ammonium hydroxide. The crude amide is purified by means of re-crystallization from an aqueous solution thereof. Alternatively, an organic amine is employed, where a primary and secondary amine results in a corresponding amide and other amides produce a quaternary ammonium salt of the corresponding acid.

The 6-nitro-2-oximino-hexanoic acid and its salt and amide produced according to this invention are identified by means of elementary analysis, and of infrared spectrum in which the salt is tested after conversion to free acid form.

The preferred embodiments are illustrated by means of examples; however, it should be understood that the examples are not intended to restrict the scope of the invention.

"Part" and "percentage" mean "part by weight" and "percentage by weight" unless otherwise specified.

EXAMPLE 1

17.2 parts of 2-nitro-6-oximino-1-cyclohexene-1-ol was added to an aqueous solution of 8.4 parts of sodium bicarbonate in 200 parts of water and dissolved within 30 minutes by heating at 60° C. under agitation. The same temperature was maintained for two more hours. Then the reaction system was neutralized with 6 N hydrochloric acid, saturated with sodium chloride and extracted three times, 100 parts of ethyl ether being used each time. The ether extract was dried with anhydrous sodium sulfate and the sodium sulfate was filtered out. The ether was removed by distillation to obtain 18.5 parts (97.4% of yield of a colorless crystal. The product was recrystallized from benzene to give a colorless needle crystal having a melting point of 116°–118° C. After twice recrystallizing from the benzene the melting point changed to 120°–122° C. The product was identified as 6-nitro-2-oximino-hexanoic acid by infrared spectrum (FIG. 1), the disassociation constant being K=1.37×10$^{-3}$ at 14° C. Elementary analysis is given as follows: Calc'd as $C_6H_{10}N_2O_5$ (percent): C, 37.90; H, 5.30; N, 14.73. Found (percent): C, 38.29; H, 5.54; N, 14.57.

EXAMPLE 2

17.2 parts of 2-nitro-6-oximino-1-cyclohexene-1-ol was added to an aqueous solution of 12.6 parts of sodium bicarbonate in 200 parts of water and dissolved at 90° C. for three minutes. The solution was held at the same temperature for an additional 30 minutes, then aftertreatments as in Example 1 were followed to obtain 14.0 parts of a crude 6-nitro-2-oximino-hexanoic acid in the yield of 73.7%.

The crude acid was purified by recrystallization from benzene to obtain a colorless needle crystal having a melting point of 117°–119° C.

EXAMPLE 3

17.2 parts of 2-nitro-6-oximino-1-cyclohexene-1-ol was dissolved in an aqueous solution of 4.0 parts of sodium hydroxide in 100 parts of water at 90° C. for seven minautes. The solution was heated for 35 minutes and then treated according to the procedures as in Example 1 to obtain 16.3 parts of a crude 6-nitro-2-oximino-hexanoic acid in the yield of 85.8%. The crude acid was recrystallized from benzene to form a colorless needle crystal having a melting point of 116°–119° C.

EXAMPLE 4

17.2 parts of 2-nitro-6-oximino-cyclohexene-1-ol was dissolved in an aqueous solution of 15.2 parts of triethyl amine in 200 parts of water under agitation. The solution was heated at 70°–85° C. for 40 minutes and treated as in Example 1 to obtain 17.4 parts of a crude 6-nitro-2-oximino hexanoic aicd in the yield of 92.1%. The crude acid was purified by recrystallization from benzene to a colorless needle crystal having a melting point of 116°–118° C.

EXAMPLE 5

Figure 2:
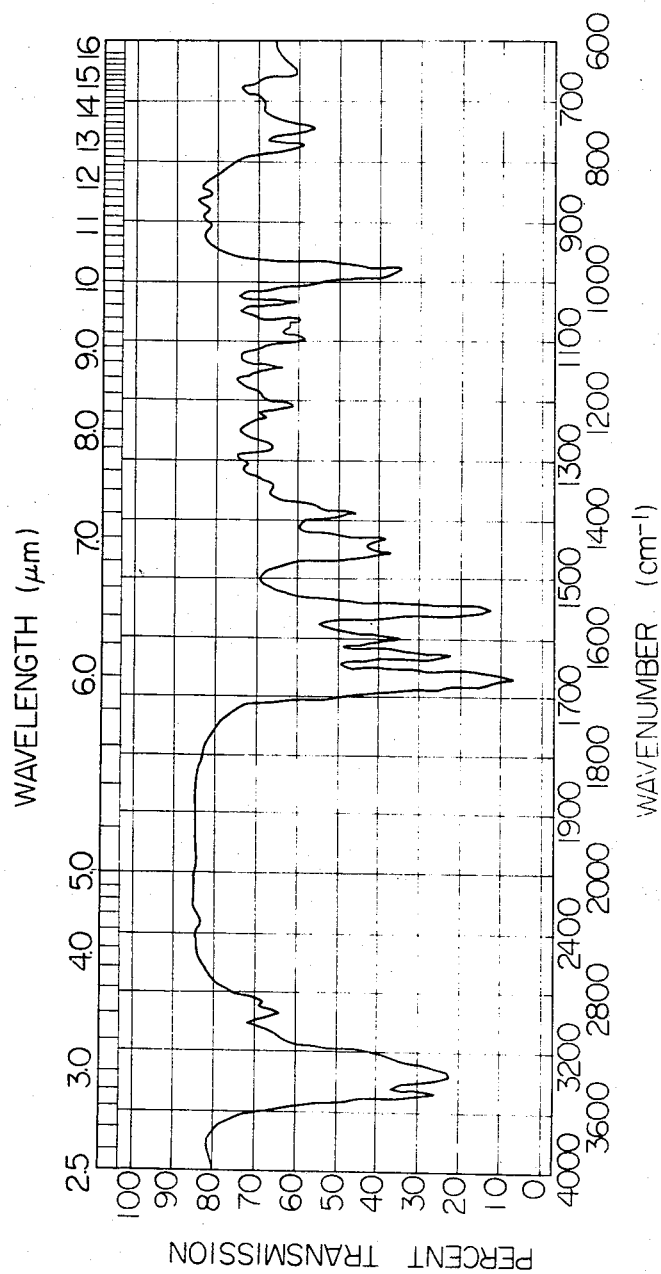

17.2 parts of 6-nitro-2-oximino-cyclohexene-1-ol and 100 parts of 7% aqueous ammonia were charged into a sealed tube and heated at 60° C. for one hour and twenty minutes. After distilling out the aqueous ammonia from the reaction system, the residue was recrystallized from water to obtain 20.2 parts of 6-nitro-2-oximino-hexanoic acid amide dihydrate having a melting point of 89°–93° C. in the yield of 85.2%. The amide was dissolved again in water and treated with active carbon, then a colorless powder having a melting point of 95°–96° C. was crystallized out. The IR is shown in FIG. 2, and elementary analysis is: Calc'd as $C_6H_{11}N_3O_5$ (percent): C, 32.00; H, 6.71; N, 18.66. Found (percent): C, 32.15; H, 6.45; N, 18.74.

EXAMPLE 6

Figure 3:
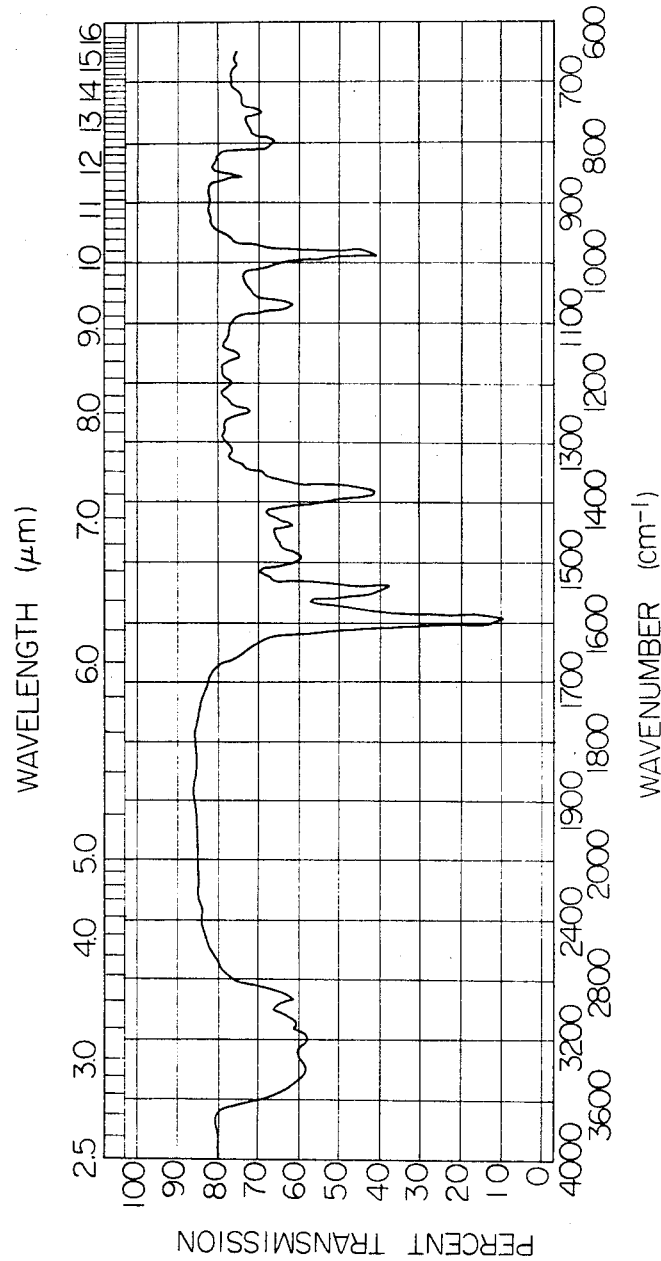

17.2 parts of 2-nitro-6-oximino-1-cyclohexene-1-ol, 8.3 parts of anhydrous sodium acetate and 150 parts of water were heated at 85° C. for one hour under agitation. The reaction system was cooled by allowing to stand and extraction was carried out to remove acetic acid formed twice, using 50 parts of ethyl ether each time. The system separated into an aqueous layer and an organic layer. The aqueous layer was neutralized with sulfuric acid and then aftertreatments were followed according to the procedures disclosed in Example 1 to obtain 15.8 parts of 6-nitro-2-oximino-hexanoic acid in the yield of 83.1%. The product had a melting point of 116°–118° C. Sodium 6-nitro-2-oximino-hexanoate converted from the product was a needle crystal and had a melting point of 176°–177° C. (decomposed). The IR of the salt is given in FIG. 3. The elementary analysis of the salt: Calc'd as $C_6H_9N_2O_5Na$ (percent): C, 33.97; H, 4.27; N, 13.21. Found (percent): C, 34.22; H, 4.41; N, 13.13.

EXAMPLE 7

According to the procedures in Example 1, 17.2 parts of 2-nitro-6-oximino-1-cyclohexene-1-ol, 7.0 parts of sodium carbonate and 180 parts of water were reacted. 15.1 parts of 6-nitro-2-oximino-hexanoic acid (79.4% of yield) having a melting point of 116° C.–118° C. was obtained. Potassium 6-nitro-2-oximino-hexanoate derived from the product was a colorless needle crystal and had a melting point of 124°–126° C. (decomposed).

What is claimed is:

1. 6-nitro-2-oximino-hexanoic acid or a salt of the acid with an alkali metal, an alkaline earth metal, a tertiary lower-alkylamine, or pyridine.
2. The metal salt of 6-nitro-2-oximino-hexanoic acid wherein the metal is an alkali metal or alkaline earth metal.
3. The compound 6-nitro-2-oximino-hexanoic acid.
4. The compound sodium 6-nitro-2-oximino-hexanoate.
5. The compound potassium 6-nitro-2-oximino-hexanoate.

References Cited

UNITED STATES PATENTS

| | | | |
|---|---|---|---|
| 3,551,465 | 12/1970 | Ellis | 260—404 |
| 2,881,215 | 4/1959 | Godt | 260—537 X |
| 3,076,026 | 1/1963 | White | 260—534 M |
| 2,999,875 | 9/1961 | Ferris et al. | 260—534 L |

OTHER REFERENCES

Godt et al.: Chem. Abs., col. 15441c, 1956.
Kikumoto: Chem. Abs., 42831p, vol. 72, 1970.
Kikumoto: Chem. Abs., 42823n, vol. 72, 1970.
March, "Adv. Org. Chem.," McGraw-Hill Book Co. (1968), pp. 481–482.

LORRAINE A. WEINBERGER, Primary Examiner

J. F. TERAPANE, Assistant Examiner

U.S. Cl. X.R.

260—295, 501.11, 561, 566A